United States Patent [19]
Ruel

[11] Patent Number: 4,726,688
[45] Date of Patent: Feb. 23, 1988

[54] MONITORED BACKGROUND RADIOMETER

[75] Inventor: Christian Ruel, Dollard-des-Ormeaux, Canada

[73] Assignee: Spar Aerospace Limited, Quebec, Canada

[21] Appl. No.: 923,922

[22] Filed: Oct. 28, 1986

[51] Int. Cl.$^4$ ............................................. G01K 17/00
[52] U.S. Cl. .................................. 374/29; 250/252.1; 374/1; 374/32
[58] Field of Search ............................ 374/29, 30–32; 250/252.1

[56] References Cited

U.S. PATENT DOCUMENTS 3,367,182  2/1968  Baxter ..................................... 374/29
3,720,103  3/1973  Adams et al. .......................... 374/29

OTHER PUBLICATIONS

Instrument Practice, Jun. 1952, "Conductivity Type Heat Flow Meters", by R. T. Fowler, et al., pp. 527–533.
L. Fried, Lockheed Report No. LMSC-D811059, 1980, ESCST Contract No. 4291, pp. 43–71.
Gilcrest A. S. and Mon, T. R., "A Calorimeter for Determining Thermal Radiation Fluxes in Space Simulation Chambers," Proc. Inst. of Environmental Sciences, 1963, pp. 369–376.
Sweet G. E. and Miller, H. B., "A Radiometer for Use in Thermal Studies of Spacecraft," NASA Technical Note D-4925, Washington D.C., Dec. 1968, 34 pages.
Redman, R. S. and Wolff, C. M., "Development of Multipurpose Radiometer", Journal of the Environmental Sciences, Mar./Apr. 1980, New York, N.Y., pp. 79–82.
Redman, R. S. and Wolff, C. M., "Development of a Multipurpose Radiometer", vol. 16, No. 5, Journal of Spacecraft and Rockets, Sep./Oct. 1979, pp. 350–353.
Two Product Data Sheets titled "Hy-Therm Pyrheliometer" Produced by Hy-Cal Engineering, 1980, two pages each.
Bachtel, F. D. and Loose, J. D., "Design and Control of an Obital Heating Simulator", AIAA paper 71–432, AIAA 6th Thermophysics Conference, Tullahona, Tenn., Apr. 1971, pp. 1–9.
Siddall J. N., "'Optisep Designers'" Optimization Subroutines ME/71/DSN/REP1, Faculty of Engineering, McMaster University, Canada, 1970, pp. 28–32.
Donato, M. et al., "Design of an Orbital Heating Simulator Using IR Techniques", 14th AIAA-NASA-/ASTM/IES Space Simulation Conference, Nasa, 1986, 11 pages.

*Primary Examiner*—Daniel M. Yasich
*Attorney, Agent, or Firm*—Rogers, Bereskin & Parr

[57] ABSTRACT

This radiometer accurately measures IR and solar spectrum radiation in a vacuum, and accounts for radiation loss from its sensing plate by measuring the housing temperature. Calibration is performed by measuring the temperature of the sensing plate and housing while power to a heater attached to the sensing plate is varied. The square of the difference between the measured power dissipation of the heater and the heat absorbed by the sensing plate as determined from the heat balance equation of the sensing plate is minimized to obtain calibration factors for the heat balance equation.

10 Claims, 4 Drawing Figures

MONITORED BACKGROUND RADIOMETER

FIELD OF THE INVENTION

This invention relates to a radiometer for measuring absorbed radiated heat flux in a vacuum, and a method of using a radiometer to measure absorbed radiated heat flux in a vacuum.

BACKGROUND OF THE INVENTION

Spacecraft are subject to heating by solar and infrared radiation which may affect their thermal and electrical performance. It is therefore desirable to know the expected absorbed heat flux in operating conditions. For this purpose, spacecraft are tested in thermal vacuum chambers to simulate orbital conditions and verify the thermal and electrical performance of the spacecraft.

The simulated orbital conditions can be achieved using the technique of IR or solar illumination. In either case it is desirable to measure accurately the radiated heat flux absorbed by the various spacecraft surfaces, and, for that reason, it has become necessary to design an accurate heat flux monitoring device or radiometer to measure, particularly, the absorbed IR radiated heat flux encountered during thermal vacuum testing.

Radiometers are difficult to design with the necessary accuracy. This is because it is difficult to isolate the heat flux sensing part of the radiometer, usually a disc or plate, so that the only heat transfer involving the sensing plate is that with the environment. The sensing plate must be fixed in place thus requiring a housing of some kind, and a temperature sensitive device, usually some kind of thermocouple, to be connected to the sensing plate. This causes conductive and radiated heat loss from the sensing plate to the thermocouple and housing. In addition the sensing plate radiates heat directly into the environment. Hence any measurement of radiated heat flux conducted by monitoring only the temperature of the sensing plate will be inaccurate.

Previous radiometers have sought to overcome this problem by, for example, thermally shielding the plate from the housing, attempting to minimize conductive and radiated losses (by using appropriate materials and coatings), and using calibration techniques with the housing maintained at a fixed temperature.

SUMMARY OF THE INVENTION

The present invention provides a monitored background radiometer with a thermally conductive housing low conductivity support means mounted on the housing, a sensing plate mounted on the low conductivity support means and spaced from the housing so as to be thermally insulated from the housing and disposed relative to the housing to receive external radiation on one side of the plate only, a heater for controllably heating the sensing plate, and first and second temperature sensitive means for measuring the temperatures of the housing and sensing plate respectively so that the heat flux at the sensing plate may be determined from the temperatures of the housing and sensing plate after calibration of the radiometer by measuring the temperatures of the housing and sensing plate while controllably heating the sensing plate.

The monitored background radiometer takes into account radiative and conductive heat losses from the sensing plate to the housing by measuring the temperature of the housing.

In another embodiment, radiative and conductive heat losses are minimized by coating the interior surface of the housing facing the sensing plate with a material having high emissivity and high absorptivity.

In a still further embodiment, radiative and conductive heat losses to the environment are minimized by thermally bonding the heater lead and the leads of the temperature sensitive means to the housing before they exit the housing.

More particularly and in a still further embodiment, this invention provides a cup-shaped thermally conductive housing, a sensing plate composed of a thermally conductive material having an upper surface and a lower surface and having a peripheral edge, the sensing plate being adapted to fit transversely across the mouth of the housing so that the peripheral edge of the sensing plate is separated from the housing by a thermally insulative gap, support means for the sensing plate adapted to hold the sensing plate transversely across the mouth of the housing so that the upper surface layer of the sensing plate faces outward of the housing and flush with the rim of the housing, the support means having low thermal conductivity, a sensing plate heater abutting the lower surface of the sensing plate and having a power lead connecting the heater to an external power source, the lower surface of the sensing plate heater and the exposed lower surface of the sensing plate being covered with a low emissivity material, a first thermocouple connected to the sensing plate and extending exterior to the housing and a second thermocouple connected to the interior of the housing and extending exterior to the housing, the housing having an aperture adapted to receive the heater power lead and thermocouples.

This invention also provides a method of operating the monitored background radiometer in a vacuum to measure absorbed radiated heat flux.

The radiometer is first calibrated without incident radiation to obtain calibration factors, being the coefficients of the capacitative, conductive and radiative components of the heat equation of the sensing plate, or to obtain curves or the equivalent relating the power level of the heater to the temperatures of the sensing plate and housing for various power levels. Absorbed radiated heat flux is then determined in operation by measuring the sensing plate temperature and housing temperature and using the heat equation with the known calibration factors or the curves or the equivalent to calculate the absorbed radiated heat flux.

BRIEF DESCRIPTION OF THE DRAWINGS

Reference will now be made to the accompanying drawings which illustrate a preferred embodiment of the invention by way of example, and in which.

DESCRIPTION OF THE PREFERRED EMBODIMENTS

General

Figure 1:
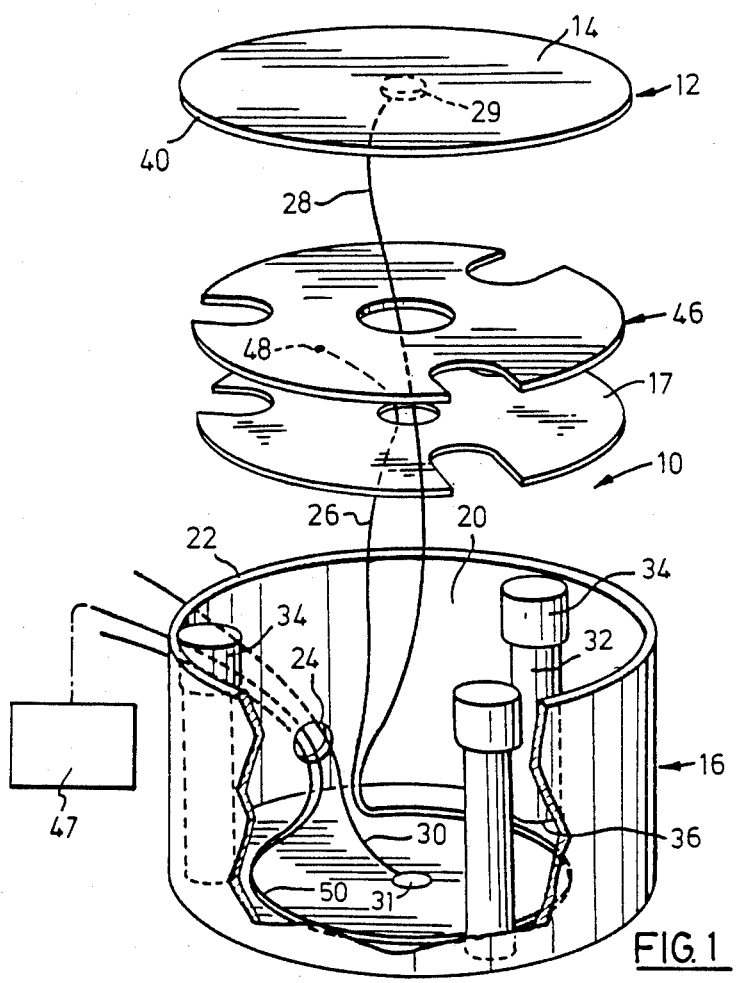
FIG. 1 is a perspective view, partially exploded and partially cut away, of the monitored background radiometer with circular sensing plate.

Referring to FIG. 1, the circular radiometer shown generally at 10 illustrates a configuration of the monitored background radiometer prepared for a specific purpose.

The monitored background radiometer may take any shape but it is desirable that the sensing plate or body, for example, circular sensing plate 12, receives direct electromagnetic radiation from sources exterior to the radiometer on one surface only (in FIG. 1, the upper surface 14 of the sensing plate 12).

To enhance the accuracy of the radiometer, the sensing plate upper surface is coated with the same coating as used on the surface to be tested.

A rectangular radiometer may be used to measure absorbed radiated heat flux experienced by second surface mirrors (SSM's) on satellites. These SSM's are rectangular to ease the manufacturing of the radiometer.

Circular radiometer 10 is designed for measurement of absorbed radiated heat flux when the sensing plate upper surface is coated with a coating such as paint or film which may be easily applied to a circular disc.

Description of the monitored background radiometer will now be made with reference to FIG. 1 for convenience although it should be understood that the description would apply to any chosen shape of the radiometer.

The Housing of the Radiometer

As shown in FIG. 1, housing 16 is cup-shaped and designed to enclose the sensing plate 12. Apart from the mouth 20 defined by rim 22 of the housing, the aperture 24, for receiving heater lead 26 and thermocouple leads 28 and 30, is the only other break in the housing. The aperture 24 is kept to a minimum size to reduce radiative heat losses from the interior of the housing to the exterior, and is preferably blocked with epoxy or other equivalent substance.

Housing 16 is composed of a high thermal conductivity material, for example, aluminum, to ensure, by reducing thermal gradients, that the thermocouple 31 reads a temperature that is representative of the average temperature of the housing. The thermocouple 31 is preferably located in FIG. 1 at the centre of the bottom of the housing but may be located elsewhere on the bottom of the housing without significant loss of accuracy. A second thermocouple (not shown) attached to the housing 16 could be used to give a more accurate average temperature of the housing, but at the expense of a loss of accuracy caused by the presence of the extra thermocouple. The exterior of the housing 16 is highly polished to ensure that very little radiation is radiated by the exterior surface of the housing.

In the preferred embodiment, the housing is made from aluminum for its high thermal conductivity and ease of working. However, other materials with high thermal conductivity such as copper or gold could be used.

The Sensing Plate Supports

Figure 2:
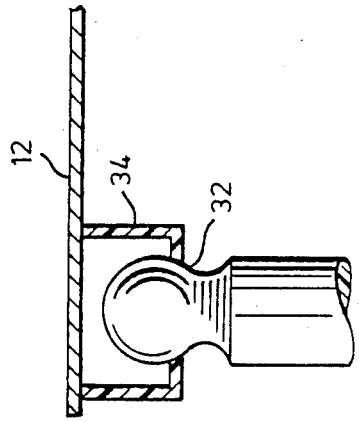
FIG. 2 is a side view of the connection between the sensing plate and one of its thermally insulative supports.

Referring to FIG. 2, flux sensing plate 12 is supported by low conductivity supports 32 mounted in low conductivity cups 34 affixed to the lower surface of the sensing plate 12. The supports may, for example, be made of tetrafluoroethylene or other insulating (low thermal) conductivity) materials. The upper end of the support 32 is machined to a sphere and fits into the bottom of the cup 34, also preferentially made of similar material. The lower end of the supports 32 are threaded to rotate within their bases 36 attached to the housing 16 (See FIG. 1). In this manner the sensing plate 12 may be adjusted to fit flush with the upper rim 22 of the housing 16, so that the upper surface 14 of the sensing plate 12, facing outward, receives direct radiation from exterior sources on one side only. This support design helps to minimize conductive heat loss from the sensing plate 12 to the housing 16.

Other support means may be used so long as the sensing plate 12 may be held within the housing 16 and thermally insulated from it.

The Sensing Plate

Figure 3B:
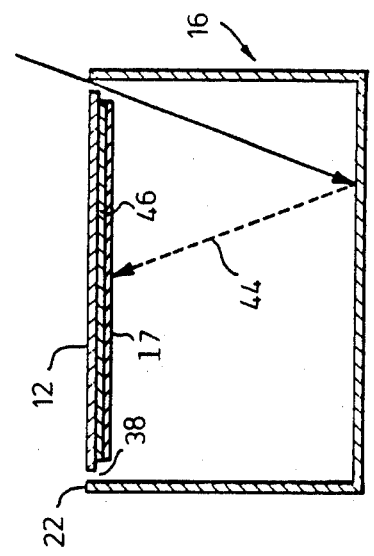
FIG. 3b is a schematic of the sensor plate and housing illustrating the reduction of radiative heat transfer from the housing to the sensor plate due to the heat reflected from sources exterior to the radiometer, and also showing the location of the heater.
Figure 3A:
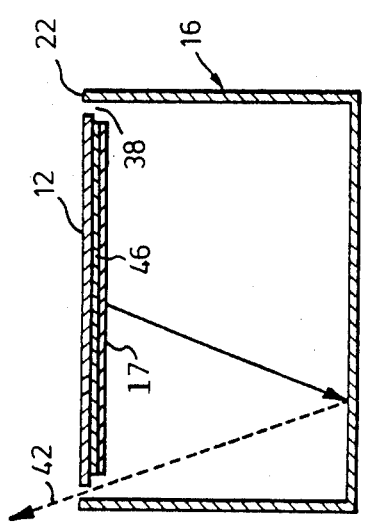
FIG. 3a is a schematic of the sensing plate and housing showing the reduction of radiative heat loss from the sensing plate to the environment by reflection from the housing, and also showing the location of the heater.

Referring to FIGS. 1, 3a and 3b, the sensing plate 12 is supported within the housing so that the upper surface 14 fits flush with the upper rim 22 of the housing 16. The sensing plate 12 is machined slightly smaller than the mouth 20 defined by rim 22 of the housing to create a thermally insulative gap 38 between the sensing plate 12 and housing 16. In the preferred embodiment the diameter of the sensing plate 12 is 1.0 inches, thickness 0.010 inches and the gap 38 between sensing plate 12 and housing 16 is 0.010 inches, although these precise dimensions are not essential to the invention.

In this manner direct radiation from sources exterior to the monitored background radiometer will be incident on the sensing plate 12 only on its upper surface 14 which faces outward. A small part that falls on the edge 40 through the gap 38 between sensing plate 12 and housing 16 may be neglected. It is desirable that the gap 38 be small to prevent excessive radiation from the exterior entering the interior of the housing 12.

The sensing plate upper surface 14 may be coated, in known fashion, to simulate the surface being tested and increase the accuracy of the radiometer. The sensing plate 12 is constructed from high thermal conductivity material, preferably aluminum, although other thermal conductivity materials are possible, to ensure that the thermocouple 29, attached in FIG. 1 to the centre of the lower surface (not shown) of the sensing plate 12, reads a temperature indicative of the average temperature of the sensing plate 12. The base of the sensing plate 12 below heater 46, discussed below is covered with a low emissivity material 17, for example, aluminized polyester film, to reduce radiative heat losses to the housing 16.

By reducing both radiative heat losses and conductive heat losses in the above-described manner, the sensing plate 12 is thermally insulated from the housing 16.

Although in this description a particular preferred embodiment of the sensing plate has been given, it will be understood by a person skilled in the art that other equivalent configurations may be substituted for the one described here. For example, it will be understood that it is desirable to have a suitable sensing plate which has an upper surface whose total radiated heat loss can be determined and which has sufficiently high thermal conductivity that the temperature sensitive device attached to it reads a temperature indicative of the average temperature of the sensing plate.

The Interior of the Housing

The interior of the housing 16 is painted black so as to have high absorptivity in the preferred embodiment for two related reasons, both of which minimize heat transfer between the sensing plate 12 and housing 16. Firstly, referring to FIG. 3a, radiative heat from the lower surface of the sensing plate 12 is primarily absorbed by the housing 16 and very little is reflected through the gap 38 between sensing plate 12 and housing 16 as indicated by the arrow 42. Secondly, referring to FIG. 3b, incident radiation from the environment exterior of the housing 16 is absorbed by the housing and very little is reflected to the sensing plate 12 as indicated by the arrow 44. Thus absorption of indirect radiation from the exterior of the housing and loss of heat from the sensing plate—housing unit to the exterior may be reduced, thereby enhancing the accuracy of the radiometer.

The Heater

Heater 46 is bonded to the lower surface of the sensing plate 12. The heater is used during calibration, as described below, to vary the temperature of the sensing plate 12. The heater 46 may, for example, be a strain gauge, however, a film heater specially designed to fit the lower surface of the sensing plate 12 is preferred. It is desirable to have a heater of low heat capacitance and for which the dissipated power is readily determinable. Due to size constraints, the heater 46 is powered by an exterior controllable source 47 through a power lead 26 attached to two terminals 48 on the under side of the heater 46.

Attachment of the Thermocouple (Temperature Sensitive Means)

In the preferred embodiment, thermocouples 29 and 31 are used to measure the temperature of the housing 16 and sensing plate 12.

Thermocouple lead 28 and heater power lead 26 are thermally bonded as shown at 50 to the base of the housing 16. This helps ensure that heat transfer from the thermocouple lead 28 and heater lead 26 is primarily to housing 16. In this manner, again, heat transfer from the sensing plate 12 to the exterior of the housing 16 is minimized.

The thermocouples 31 and 29 are thermally bonded to the centre of the base of the housing 16 and the centre of the lower surface of the sensing plate 12 respectively by, for example, soldering. The thermocouples may be any commercial thermocouple or arrangement of thermocouples to provide a temperature sensitive means of appropriate size and sensitivity. An equivalent temperature sensitive means such as a thermistor may be used in place of the thermocouples.

Operating Equation of the Radiometer

In operation, actual tests are performed in a vacuum with the heater set at a known power level (zero power is most convenient). To determine the heat flux at the sensing plate, the temperatures of the sensing plate and housing are measured and the absorbed heat flux determined from the heat balance equation or an equivalent device such as a graph relating the recorded temperatures to the power level of the heater.

The heat balance equation for the radiometer is:

$$Q = F_1 \frac{dT_s}{dt} + F_2(T_s - T_b) + \sigma F_3(T_s^4 - T_b^4) + \sigma A E T_s^4 \quad (I)$$

in which

Q is the heat flux absorbed by the sensor, originating from all external radiative sources;

$F_1$, $F_2$ and $F_3$ are factors determined on calibration;

$T_s$ is the temperature of the sensing plate 12 as indicated by the thermocouple 29;

$T_b$ is the temperature of the housing as indicated by the thermocouple 31;

$\sigma$ is the Stefan-Boltzman constant;

E is the emissivity of the upper surface 14 of the sensing plate; and

A is the surface area of the upper surface 14 of the sensing plate.

The first term of equation 1 represents the amount of energy stored in the sensing plate 12, and is significant only when the sensing plate temperature is rapidly changing. The second term represents the radiative heat loss from the sensing plate 12 to the housing 16. The third term represents the conductive heat loss from the sensing plate 12 to the housing 16. The fourth term represents the energy radiated from the upper surface 14 of the sensing plate 12 to the exterior of the housing 16.

Hence, if the calibration factors for the monitored background radiometer are known or contained in an equivalent representation such as a curve of various power levels as a function of the recorded temperatures, the absorbed radiated heat flux may be determined from the heat balance equation or the curves given the temperatures of the sensing plate 12 and housing 16 as indicated by the thermocouples 29 and 31 respectively. Other methods of determining the relationship between the temperatures measured by the thermocouples and the heat dissipated by the heater may be used to establish a relationship between this at the sensing plate and the temperatures of the sensing plate and housing 16.

Calibration of the Monitored Background Radiometer

The calibration factors, $F_1$, $F_2$ and $F_3$ are determined during calibration of the monitored background radiometer. For each testing environment, that is, for each simulated orbiting spacecraft in the vacuum chamber, it is desirable that the calibration of the radiometer with the new test surface on the sensing plate be repeated for greatest accuracy to determine a new set of calibration factors. If desired, the radiometer may be calibrated to expected test conditions. This may be done either by testing first and finding a range of expected temperatures of the sensing plate and housing or analyzing the radiometer to determine expected temperatures of the sensing plate and housing under given conditions. In either case, calibration may then be carried out in the expected range of temperatures. In the general case, however, the radiometer is calibrated over a wide range of temperatures.

For each calibration, the monitored background radiometer is located in a vacuum chamber with known chamber wall temperature $T_w$. The heater 46 is set at a series of power levels and the temperatures $T_{si}$ and $T_{bi}$ of the sensing plate 12 and housing 16 respectively as indicated by their respective thermocouples are measured as a function of time for each power level to produce two corresponding series of measured temperatures, $T_{si}$, i=1 . . . n and $T_{bi}$, i=1 . . . n. The calibration equation of the monitored background radiometer derived from equation I is:

$$Q_{Ci} = F_1 \frac{dT_{si}}{dt} + F_2(T_{si} - T_{bi}) + \sigma F_3(T_{si}^4 - T_{bi}^4) + \sigma AE(T_{si}^4 - T_w^4) \quad \text{II}$$

The calibration factors, $F_1$, $F_2$ and $F_3$ may then be determined by minimizing the equation:

$$\phi = \sum_{i=1}^{n} (Q_{Hi} - Q_{Ci})^2 \quad \text{III}$$

where $Q_{Hi}$ is the measured power dissipated by the heater 46 and $Q_{Ci}$ is determined from equation II.

Equation III can be minimized by any of a number of known procedures, for example, a simplex optimization program to determine the calibration factors for the radiometer under chosen test conditions.

Other ways of determining the calibration factors or the equivalent may be used without departing from the spirit of the invention. For example, with the heater 46 set at various power levels, the variation of power level as a function of the temperature of the sensing plate and the temperature of the housing may be used to determine a set of curves which effectively embody the information given by the calibration factors $F_1$, $F_2$ and $F_3$. During testing, the recorded temperatures of the housing and sensing plate may then be compared with the various curves to determine the flux at the sensing plate.

Once the calibration factors or the curves are determined, equation I or the curves, respectively, may be used to determine the heat flux at the sensing plate from the measurement of the sensing plate temperature and housing temperature.

I claim:

1. A monitored background radiometer comprising:
a thermally conductive housing;
low conductivity support means mounted on the housing;
a sensing plate mounted on the low conductivity support means and spaced from the housing so as to be thermally insulated from the housing and having an outwardly facing first surface;
the sensing plate being disposed relative to the housing to receive direct electromagnetic radiation from sources exterior to the radiometer upon said first surface only;
means for controllably heating the sensing plate;
first temperature sensitive means to measure the temperature of the housing; and
second temperature sensitive means to measure the temperature of the sensing plate, so that the heat flux at the sensing plate may be determined from the temperatures of the housing and sensing plate after calibration of the radiometer by measuring the temperatures of the housing and sensing plate while controllably heating the sensing plate.

2. The monitored background radiometer as claimed in claim 1 in which the outwardly facing first surface defines a plane and the sensing plate is surrounded by said housing on all sides except the side defined by the outwardly facing first surface.

3. The monitored background radiometer as claimed in claim 2 in which the interior of the housing has high absorptivity, said heating means includes a power lead, and each of said temperature sensitive means includes a lead.

4. The monitored background radiometer as claimed in claim 3 in which said power leads and said lead of said first second temperature sensitive means are each thermally bonded to the interior of the housing to reduce heat loss to the environment exterior to the housing.

5. The monitored background radiometer as claimed in claim 3 in which:
the housing is cup-shaped and defines a mouth and has an aperture for receiving the power lead and temperature sensitive means;
the sensing plate has a peripheral edge and a second surface facing inward of said housing;
the heating means being mounted on said second surface;
the heating means having a side facing the housing and being substantially covered on said side with a material having low emissivity, and the sensing plate second surface being covered with a low emissivity material in places not covered by the heating means;
the sensing plate being adapted to fit transversely across the mouth of the housing so that the peripheral edge of the sensing plate is separated from the interior of the housing and thermally insulated therefrom;
the first temperature sensitive means includes a first thermocouple connected to the sensing plate;
the second temperature sensitive means includes a second thermocouple connected to the housing; and
the support means is adapted to hold the sensing plate transversely across the mouth of the housing so that the upper surface of the sensing plate faces outward of the housing and flush with the rim of the housing.

6. The monitored background radiometer as claimed in claim 5 in which the interior of the housing has high absorptivity.

7. The monitored background radiometer as claimed in claim 5 in which the sensing plate is rectangular.

8. The monitored background radiometer as claimed in claim 5 in which the sensing plate is circular.

9. A method of measuring the amount of radiation absorbed by a body in a vacuum, said body being disposed in and thermally insulated from a thermally conductive housing and said body having heating means with a controllable power source coupled to said body, comprising calibrating the body and housing by;
(a) energizing said heating means with said controllable power source at a plurality of different power levels in the absence of any of said radiation to simulate the radiative heat loads absorbed by the body during actual measurement of the heat absorbed by the body;
(b) measuring the temperature of the body and the housing as a function of time for each power level;
(c) determining the relationship between said power levels and said temperatures measured in step (b) so as to relate known heat aborption by the body to known temperatures of the body and housing;
and subsequently measuring the heat absorbed by the body by;

(d) measuring the temperatures of said body and said housing when said radiation is incident upon said body; and (e) determining the amount of the radiation absorbed by the body by relating the temperatures of said body and said housing as determined in step (d) to the corresponding power level determined in step (c).

10. The method of measuring the amount of radiation absorbed by a body in a vacuum as claimed in claim 9 in which the relationship between said power levels and said temperatures measured in step (b) is determined by minimizing the equation:

$$\phi = \sum_{i=1}^{n} (Q_{Hi} - Q_{Ci})^2$$

to obtain a set of calibration factors for the heat equation of the body and housing:

where $Q_{Hi}$ is a measure of the power dissipated by the heating means, $Q_{ci}$ is determined from the heat equation for the body and housing, n is the number of measurements in step (b), and the amount of heat determined in step (e) is calculated from the heat equation using said calibration factors.

* * * * *